(12) United States Patent
Hayball et al.

(10) Patent No.: US 6,349,332 B2
(45) Date of Patent: *Feb. 19, 2002

(54) MECHANISM FOR INTEGRATION OF MANAGEMENT FUNCTIONALITY IN COMMUNICATIONS NETWORKS

(75) Inventors: Clive Colin Hayball, Sawbridgeworth; Nigel Lawrence Bragg, Weston Colville; Niall Forbes Ross, Great Dunmow; Peter Jamieson Tatterfield, Chelmsford, all of (GB)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/124,479

(22) Filed: Jul. 29, 1998

(51) Int. Cl.[7] .............................................. G06F 15/173
(52) U.S. Cl. ........................................ 709/223; 345/969
(58) Field of Search ................................. 709/223–224; 345/969, 356, 734–743; 379/201.02, 201.03

(56) References Cited

U.S. PATENT DOCUMENTS

| | | | | |
|---|---|---|---|---|
| 5,295,244 A | * | 3/1994 | Dev et al. | 709/223 |
| 5,559,958 A | * | 9/1996 | Farrand et al. | 714/27 |
| 5,586,255 A | * | 12/1996 | Tanaka et al. | 709/223 |
| 5,710,727 A | * | 1/1998 | Mitchell et al. | 702/128 |
| 5,774,689 A | * | 6/1998 | Curtis et al. | 709/205 |
| 6,018,625 A | * | 1/2000 | Hayball et al. | 709/223 |
| 6,070,188 A | * | 5/2000 | Grant et al. | 709/223 |
| 6,233,610 B1 | * | 5/2001 | Hayball et al. | 709/223 |

FOREIGN PATENT DOCUMENTS

| | | | | |
|---|---|---|---|---|
| EP | 0 585 082 A3 | * | 7/1983 | H04L/12/24 |
| EP | XP 00430982 | * | 11/1993 | H04Q/3/00 |
| EP | 0695100 A2 | * | 1/1996 | H04Q/3/00 |

(List continued on next page.)

OTHER PUBLICATIONS

Apostopoulos, T., et al., "A Model for SNMP Based Performance Management Services," IEEE Catalogue No. 95TH8061, pp. 269–273, Jul. 1995.*
Ho, M., et al., "SNMP Management of Telecommunications Carrier Networks," IEEE Accession No. 0–7803–2518–4/96, pp. 200–212a, Apr. 1996.*

Primary Examiner—Zarni Maung
Assistant Examiner—Andrew Caldwell
(74) Attorney, Agent, or Firm—Lee, Mann, Smith, McWilliams, Sweeney & Ohlson

(57) ABSTRACT

Management functionality in a communications network is integrated using a design module for constructing a management information base (MIB). A unit of manageable physical resources is represented in the MIB by a management unit comprising a collection of managed objects representing actual physical and logical resources in the network. The functionality provided by those physical and logical resources is represented separately and independently from the objects representing those physical and logical resources. A realisation model associates classes of objects representing the functionality with classes of objects representing the physical and logical resources. In an embodiment, an Application model represents the functionality of network resources. An Implementation model represents the actual, specific implementation of how that functionality is carried out. A set of realisation associations links an application model to an implementation model to form a realisation model. Division and representation of physical and logical resources in the MIB by the management unit method allows substitution of physical and logical resources by different implementations of similar resource components without reconfiguring the parts of the MIB representing the functionality.

16 Claims, 18 Drawing Sheets

FOREIGN PATENT DOCUMENTS

| | | | | |
|---|---|---|---|---|
| EP | 0 585 052 A1 | * | 3/1996 | G21E/3/334 |
| GB | 2308779 | * | 7/1997 | H04Q/3/00 |
| WO | WO 95/23469 | * | 8/1995 | H04L/12/24 |
| WO | WO 95/34856 | * | 12/1995 | G06F/9/44 |
| WO | WO 95/34975 | * | 12/1995 | H04L/12/24 |
| WO | WO 95/343974 | * | 12/1995 | H04L/12/24 |

* cited by examiner

MECHANISM FOR INTEGRATION OF MANAGEMENT FUNCTIONALITY IN COMMUNICATIONS NETWORKS

FIELD OF THE INVENTION

The present invention relates to network management and particularly, although not exclusively, to a method of implementation of a management system.

BACKGROUND TO THE INVENTION

The advent of broadband networks' technologies such as ATM and SDH is causing network operators and suppliers to re-think the way in which telecomms systems are constructed and managed. Monolithic network elements such as tandem switches are now being replaced or augmented by a new generation of systems which comprise loosely coupled elements distributed across a broadband infrastructure. Furthermore, the services offered by such systems need not map precisely onto a set of dedicated elements, as the various elements can now share their resources across services in a flexible manner.

This decoupling of services from elements and resources presents new management challenges. Services offered by such systems must be managed, as they are the primary instrument of revenue generation for network operators. Equipment and resources must also be managed in order to support services effectively. Additionally, management of services needs to be coupled with management of equipment and resources in order to automate those management processes, such as flow-through provisioning and service impact analysis, which contribute to efficient, cost-effective operations.

These new systems have the following characteristics which impact upon their manageability.

Systems and services are composed from logical resources (e.g. resilient processing platforms, diversely routed connections) which are themselves constructed out of physical components and assemblies of components. Integrated management requires manipulation of the relationships between components and resources within each service context.

Systems are Quality-of-Service (QoS) users of a Virtual Private Network (VPN) overlay onto the underlying broadband network. Details of the broadband network should be hidden from these systems in all but exceptional circumstances.

Equipment types are heterogeneous, multi-technology and potentially multi-vendor. Because these systems incorporate novel and proprietary approaches to the provision of services, there are usually no standard information models to support management at the levels of equipment and logical resources.

Services are complex and need to be managed separately from the logical and physical resources out of which they are constructed. Speed-to-market pragmatics demand reuse of resource management functionality across different systems and services wherever possible.

Prior art inventions have addressed this problem from several perspectives. Blau, Eneroth and Carlsund (WO 95/34974) proposed creating "black-box" and "white-box" models on an interface between an operations support network and a managed system, with a hierarchical composition of models based on the ITU "managed element" concept. Hayball, Bragg and Tattersfield in U.S. Ser. No. 08/921,649, now abandoned, and U.S. Pat. No. 6,018,625 the contents of which are incorporated herein by reference, have proposed a design method and management system architecture which separates management of equipment from management of application and allows potentially many different interface "views" to be supported. These inventions address the desired structure of management systems (internally) and interfaces (externally), but do not provide a consistent, comprehensive means to link the models and/or interfaces together in order to support truly integrated systems management.

SUMMARY OF THE INVENTION

This invention introduces a concept of a "realised-by" association to extend the ITU TMN framework to support integrated management. The invention is targeted towards integrated management of systems and services constructed from distributed elements (hereafter known as "the network"). It is therefore applicable to several levels of the TMN hierarchy (network element, element management, network management and potentially service management). The invention is also equally applicable to the way in which data and functionality is structured within a managed system and to the way in which management functionality is exported across a management interface, such as Q3 interface, to an Operations Support System (OSS) or other user.

Aspects of the present invention combine with the teaching of U.S. Ser. No. 08/921,649, now abandoned, and U.S. Pat. No. 6,018,625 to form an overall network modeling method, with an object of raising of the semantic level at which a network is managed in a way that is compatible with existing standards. The network modeling method systematically groups low-level Managed Object classes found in a Management Information Base (MIB) schema of a typical network management in higher-level units of modeling. These higher level models represent the network to the management system and are the means by which the management system applies commands to the network.

According to a first aspect of the present invention there is provided a network management system for managing a communications network, said management system comprising:

at least one processor; and a data storage device, wherein functionality and resources of said communications network are represented by managed objects, and at least one association links classes of said managed objects representing said functionality with classes of said managed objects representing said resources.

The processor and data storage device cooperate for management of said communications network by storing said managed objects and by performing operations on said managed objects, which are replicated by corresponding operations carried out on physical resources such as network elements and components represented by said managed objects.

A plurality of said associations may be contained within a realisation model.

The realisation model preferably comprises at least one realised by association.

Preferably, the associations comprise pointer attributes of classes of said managed objects representing said network functionality and said network resources.

According to a second aspect of the present invention, there is provided a method of creating a network management system for managing a communications network wherein functionality and resources of said communications network are represented by managed objects, said method comprising the step of:

creating at least one association linking classes of said management objects representing said network functionality with classes of said managed objects representing said network resources.

Preferably said classes and said associations are represented by means of object oriented modeling.

According to a third aspect of the present invention there is provided a design method for creating a management system for managing a plurality of physical and logical resources, said design method comprising the steps of:

identifying a unit of said resources to be managed as a whole;

for each of a plurality of functions carried out by said managed unit, representing said function by a "black box" representation in which said functionality is represented as a set of managed objects, independently of the specific physical resources which provide said functionality;

for each said "black box" managed object representation of functionality, representing physical and logical resources which implement said functionality by at least one "white box" managed object representation; and associating said "black box" managed object representations with their corresponding "white box" representations by means of a plurality of associations.

Suitably, a plurality of said "black box" representations are collectively associated with a corresponding plurality of said "white box" managed object representations, by a plurality of corresponding said associations.

According to a fourth aspect of the present invention there is provided a management system for managing a plurality of physical and logical resources co-operating to provide communications functionality, said management system comprising a data processing means and a data storage means, a method of representing said physical resources by a plurality of managed object models comprising:

a management unit object model, said management unit object model comprising a model of "black box" managed objects representing a functionality provided by said resources independently of implementation of said functionality;

a plurality of "white box" managed objects, said "white box" managed objects representing implementation of said functionality by said plurality of physical resources; and a plurality of associations, said associations connecting a plurality of endpoints and capabilities of said "black box" managed objects with a corresponding set of end points and capabilities of said "white box" managed objects.

A said association comprises an asymmetric relationship.

A said endpoint may comprise a managed object representing a physical endpoint.

A said endpoint may comprise managed object representing a logical endpoint.

A said capability may comprise a managed object representing a behavior which represents transformation of data between at least one endpoint and at least one said "black box" managed object.

A said capability may comprise a managed object representing a cross-connection between first and second physical or logical endpoints.

A said capability may comprise a managed object representing an interworking function between first and second physical or logical endpoints.

A said "black box" managed object may comprise a behavior object, said behavior object representing interconnections between said physical resources

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Figure 1:
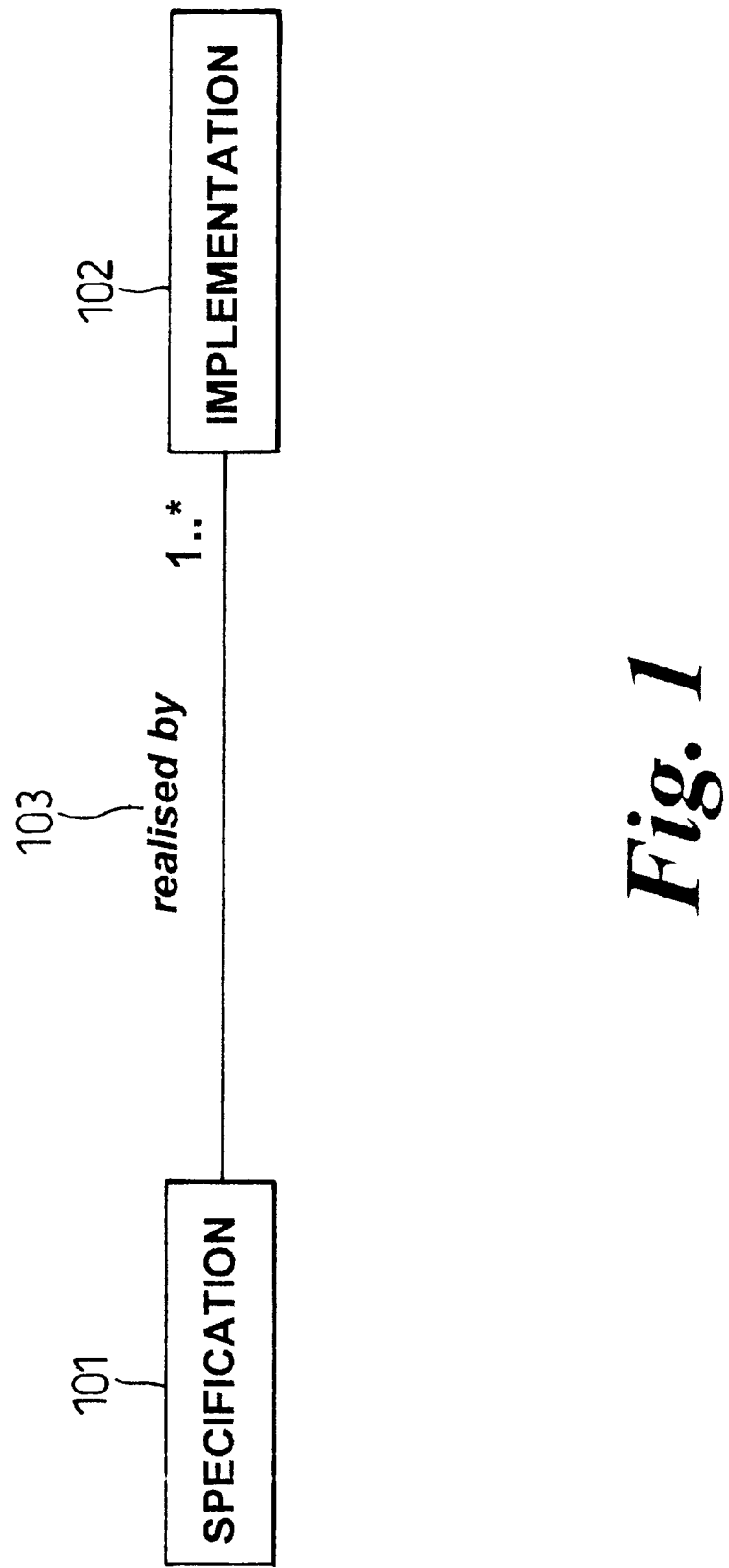
FIG. 1 illustrates schematically an association between a specification object and an implementation object representation part of a management information base for a communications network.

Referring to FIG. 1 herein, there is illustrated schematically an association, hereinafter termed a "realised by" association, represented using Unified Modeling Language (UML) notation. UML notation was devised by Booch, Rumbaugh and Jacobson and is known to those skilled in the art (see for example "UML Distilled" by Martin Fowler, published by Addison Wesley 1997). It will be appreciated by a person skilled in the art that whilst UML notation is used herein for description of specific methods and processes according to the present invention, the underlying methods, processes and apparatus according to the invention are independent of the languages and notations used to describe their specific implementation. Other semantically equivalent object-oriented (OO) notations can be used.

The "realised by" construct comprises a specification object 101, one or more implementation objects 102, and an association 103 connecting the specification object and the implementation objects.

That is to say, a set of underlying physical resources comprising a physical communications network perform a defined functionality. The managed functionality is described in a management information base by the specification object 101. The actual managed physical and logical resources implementing the functionality are described and represented in the management information base by data in terms of one or more implementation objects 102. Each implementation object 101 helps realise the specification object 102 by providing data and behavior describing the actual managed physical and logical resources through which the managed functionality described by the specification object 101 is actually implemented. The realised by association represents that a certain unit of functionality is implemented by specific physical and logical resources within a network, the functionality represented by the specification object and the physical/logical resources specified by the implementation object, by associating the specification object with the implementation object, the realised by association represents the actual realisation of functionality by physical and logical components in the network.

Figure 2:
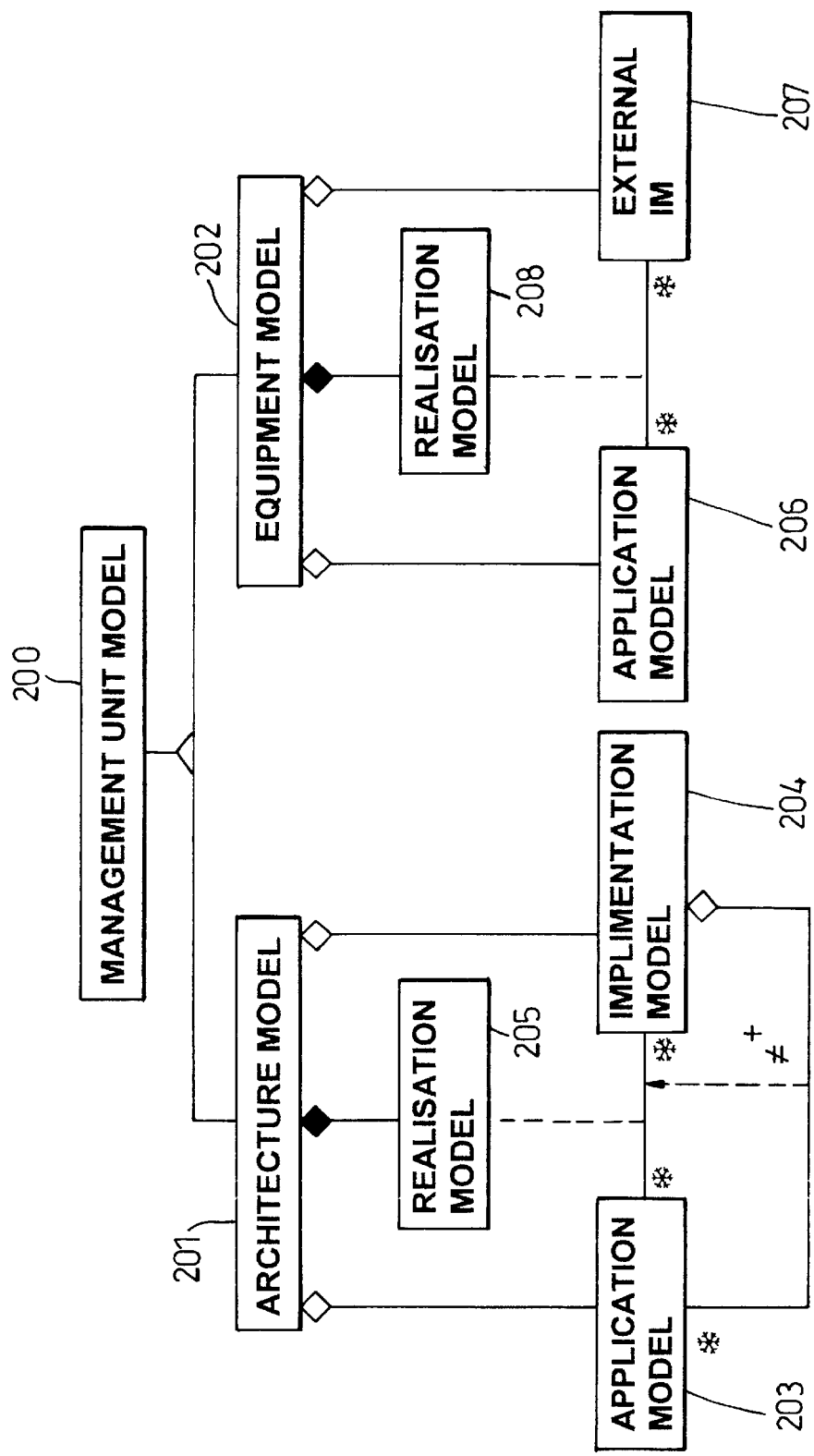
FIG. 2 illustrates schematically a Management Unit Model representing in a management information base a unit of manageable physical and/or logical resources in a physical network.

Within a management information base of the management system of the communications network, a plurality of realised by associations are collectively grouped to form a Realisation Model. Referring to FIG. 2 herein, in the specific implementation herein, a taxonomy of models and their relationships has been developed, which forms a plan for an overall construction of a management information base. Referring to FIG. 2, a Management Unit Model 200 comprises an Architecture Model 201 or an Equipment Model 202. The Architecture Model 201 comprises an Application Model 203, an Implementation Model 204, and linking the Application Model and Implementation Model a Realisation Model 205. The Equipment Model 202 comprises a second Application Model 206, an external Implementation Model 207, and linking the second Application Model and external Implementation Model, a second Realisation Model 208.

An Architecture Model is composed of a plurality of a lower level models, whereas an Equipment Model communicates directly with actual physical managed equipment or with an external management system. An Architecture Model contains an Application Model which is realised by an Implementation Model, whereas an Equipment Model contains an Application Model which is realised by external managed resources. Architecture Models exist wholly within the modeling system described herein. An Equipment Model exists at the boundary between the modeling system described herein and the resources these models help to manage.

The Application and Implementation Models comprise assemblies of specific specification and implementation classes respectively. These concepts are disclosed in prior disclosures U.S. Ser. No. 08/921,649, now abandoned, an U.S. Pat. No. 6,018,625, the contents of which are incorporated herein by reference.

Realisation Models comprise assemblies of specific "realised by" associations. The concept of a Realisation Model is presented in this disclosure in further detail by way of examples hereinafter.

A Management Unit Model is built from an Application Model, an Implementation Model and a Realisation Model. The concepts of a Management Unit Model and its specializations are also presented herein.

Whereas prior art management information base schema merely capture the state of managed objects and how they are connected, the methods and implementations presented herein capture and organize the information of how high-level (more abstract) capabilities of a network are realised in terms of lower-level (more specific) ones. The Realisation Model provides a basis for the modeling of how managed capabilities of individual system elements combine to form more abstract managed capabilities.

The "realised by" association enables a simple, consistent approach to integrated management of distributed, multi-component telecommunications systems and may provide users of a managed system with the ability to see and manage system entities at a variety of levels, both physical and logical, with mappings between levels to ensure that the managed system functionality can support a close fit to the needs of individual operational practices. This may result in significant reduction in operational costs.

Additional benefits arise from the organization of "realised by" associations into Realisation Models, and of Application, Implementation and Realisation Models into Management Unit Models as follows:

Firstly, flow-through provisioning often requires observing constraints between several "realised by" associations. The Realisation Model provides the unit for managing such constraints, and the similar constraints that occur in other network management functions handled on a flow-through basis, either downward from Application Model to Implementation Model or upward as in service impact analysis.

Secondly, an ability to construct different Management Unit Models containing a same top-level Application Model supports resilience in the face of changes in the kinds of network elements.

Thirdly, the Realisation Models' reflection of how the network elements support each other assists in distributing network management functionality compatibly with the distribution of the network itself.

Specific implementations according to the invention may be explained at two levels as follows:

a Managed Object level of network description a model level of network description (hereinafter called the Management Unit level).

The management unit level organizes the managed object-level classes and relationships into models. Each model is a configuration of managed object-level classes and relationships representing some manageable unit of network functionality. Each model corresponds to one of the kinds defined by the method. The method requires several kinds of model. All models are expressed herein in UML, a known standard object oriented modeling notation.

The next section of this description presents the managed object-level "realised by" association and illustrates it by example in the context of various models. The section following presents management unit-level Realisation and Management Unit Models.

The "Realised By" Association (Managed Object Level)

The examples which follow illustrate the best mode contemplated by the inventors for deploying the "realised by" association mechanism. They show how this management construct can be applied consistently to a variety of management situations, including application-to-equipment mappings, equipment, line and software protection, communications layer mappings and data table mappings.

The best way to implement the "realised by" association is by means of pointer attributes. The specification object implements functionality which uses the "realised by" pointer(s) to access implementation objects pertinent to the job in hand. Conversely, each implementation object contains pointer attributes to the one or more specification objects it realises; it implements functionality which uses these pointers to convey information to its specification objects concerning its ability to provide the quality of service desired by these specifications. In general, the specification-to-implementation pointers support flow-through provisioning and the implementation-to-specification pointers support service impact analysis.

Other options are open to the implementor, e.g. by means of a separate "realised by" managed object providing an explicit representation of the association or by using inheritance to realise the implementation objects as specializations of their specifications.

EXAMPLE 1

Application-to-Equipment Mapping

Figure 3:
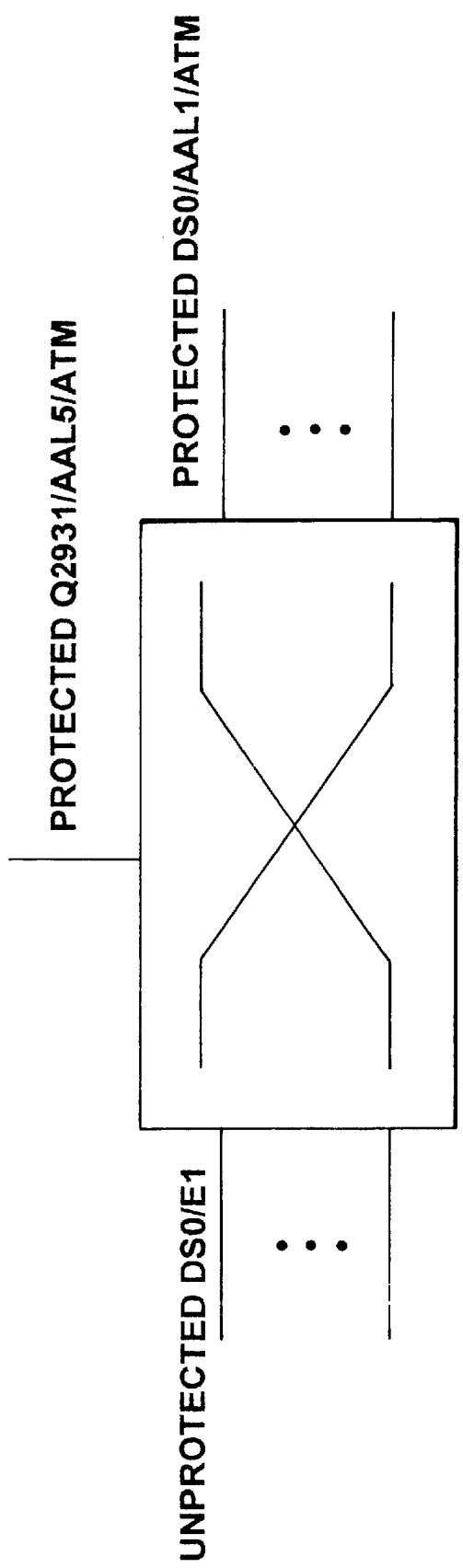
FIG. 3 illustrates schematically a "black box" Application Model representation of a cross-connect device providing conversion of 64 k voice channels between a time division multiplex regime and an asynchronous transfer mode regime.

FIG. 3 provides a protocol model of a cross connect application, which converts 64K voice channels between TDM (as DS0s on an E1 interface) and ATM (as AAL1 VCCs). Individual DS0 cross-connections are controlled using Q.2931 signaling from some external system. ATM physical interfaces are 1+1 protected to provide resilience against single failures such as fiber breaks.

Figure 4:
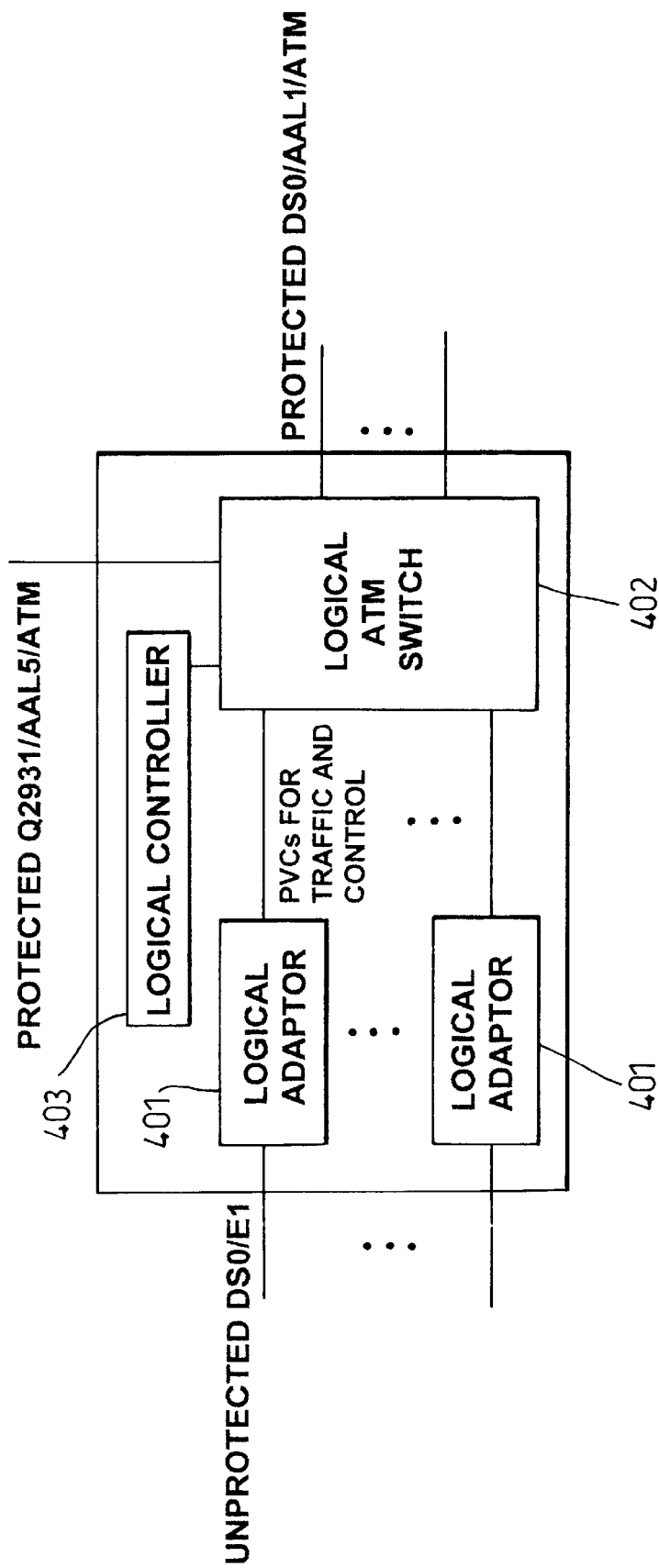
FIG. 4 illustrates schematically a "white box" Implementation Model which represents actual physical and/or logical resources for carrying out the functionality represented by the "black box" representation of FIG. 3 herein.

FIG. 4 provides a protocol model of a system architecture which realises the application from FIG. 3 herein. The system comprises three logical components, being: an Adaptor 401, which converts between TDM and ATM; an ATM Switch 402, which provides external ATM interfaces and cross-connects between ATM VCCs; a Controller 403, which processes Q.2931 signaling messages and instructs the Adaptor and ATM Switch to make or break individual TDM-to-ATM connections.

FIG. 4 also shows how these logical components are linked together internal to the system to support the desired functionality.

Figure 5:
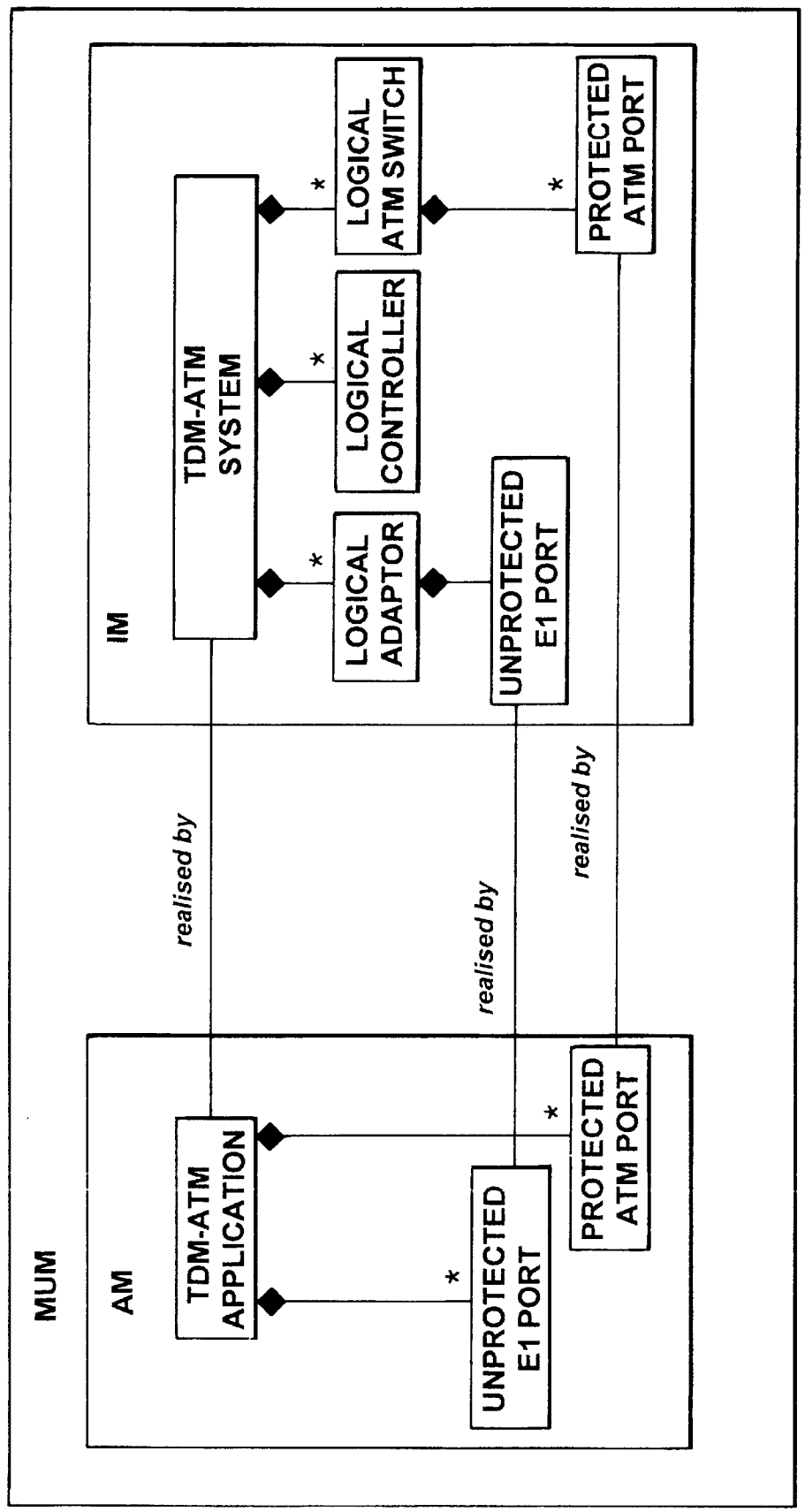
FIG. 5 illustrates schematically a model of managed objects linking the "black box" representation of FIG. 3 with the "white box" representation of FIG. 4, by means of a plurality of associations which realise individual components of the "black box" representation by their corresponding individual components in the "white box" representation.

Referring to FIG. 5 herein, there is illustrated a Management Unit Model (depicted using UML notation) which uses "realised by" associations to indicate how the application as shown in FIG. 3 herein is realised by the logical components and interfaces of the system architecture shown in FIG. 4 herein. Note that this model has been deliberately simplified to highlight the specific use of the "realised by" association pertinent to this example. It is indicated in FIG. 5 which of the objects fall within the AM and which within the IM.

The composite object model depicted in FIG. 5 herein has the following features:

It is composed out of two separate object models—one for the TDM-ATM application and one for the TDM-ATM system which realises the application. These two object models are linked together using the "realised by" associations.

Each managed object has a single parent via a containment relationship.

The objects TDM-ATM Application and TDM-ATM System form separate containment sub-trees. For alignment with TMN object structures, these are sub-types of Managed Element and are contained under a single parent. (The parent is not shown in FIG. 5 herein.)

EXAMPLE 2

Equipment Protection

Telecoms systems equipment is often replicated in order to enhance overall system reliability and to maintain a high level of service availability in the event of equipment failure. Equipment protection is almost inevitably inter-related with communications protection (see example 3 below).

A variety of protection regimes have been devised to address equipment protection, e.g. load-sharing, active-standby, with 1+1 through to 1:N resiliency. These régimes are fundamentally similar from the perspective of the functionality they offer, with subtle differences in the way they are realised.

The "realised by" association can be used to model various forms of equipment protection, including 1+1 and 1:N. The Logical Adaptor shown in FIG. 4 herein provides an example of 1+1 protection.

Figure 6:
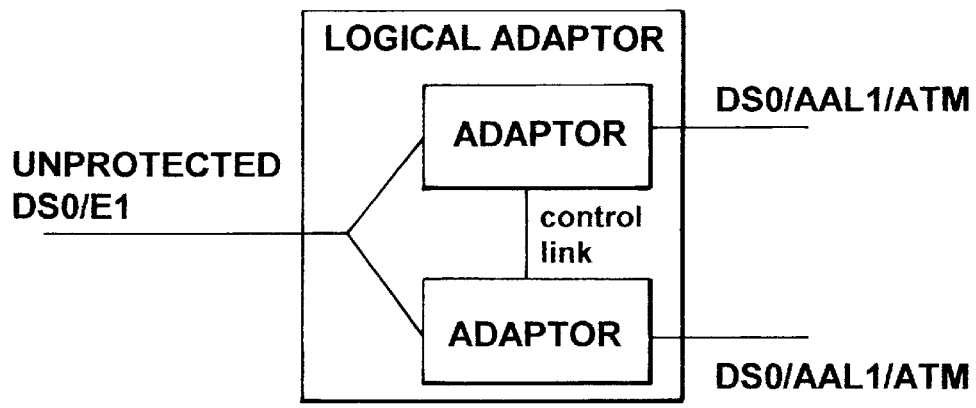
FIG. 6 illustrates schematically an example of a managed object representation of a "Y" joint used to couple a single E1 interface into two separate powered termination units for a logical adaptor apparatus.

A common approach to equipment protection on E1 interfaces is to use a "Y" joint to couple a single E1 interface into two separate, independently powered termination units. FIG. 6 herein illustrates how this would work for the Logical Adaptor.

The "realised by" association provides the means to model the Logical Adaptor and (physical) Adaptor separately and to link them together. The resultant management model is as depicted in FIG. 7 herein.

Figure 7:
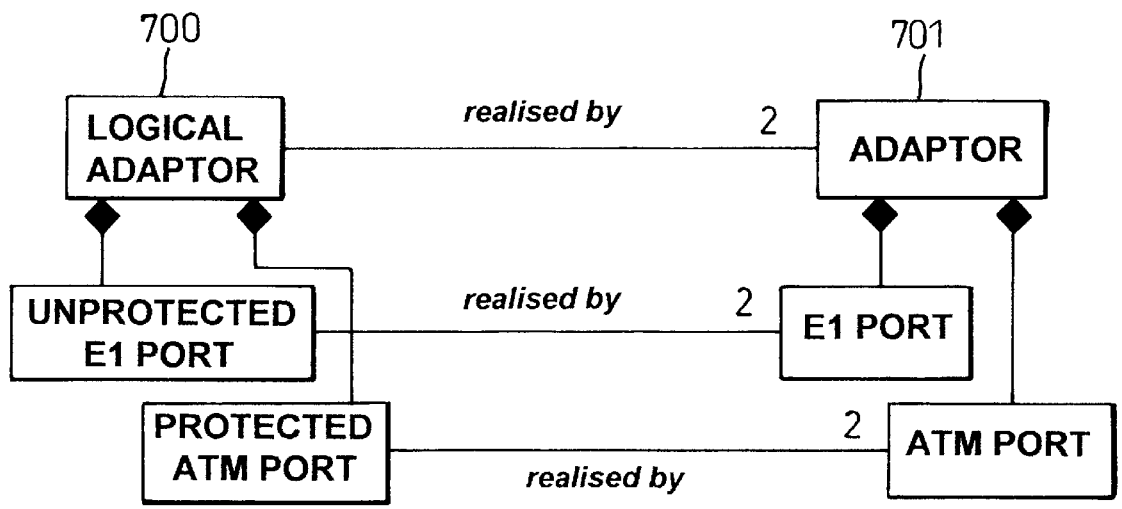
FIG. 7 illustrates schematically a management model of a unit of physical/logical resources comprising a logical adaptor, implemented by a physical adaptor, and illustrating a plurality of realised by associations linking managed objects representing the logical adaptor functionality with the physical implementation provided by the physical adaptor.

The equipment protection model of FIG. 7 has the following features.

- The control link between each pair of Adaptor objects 700, 701 has been omitted—this link is hard-wired and therefore cannot be managed.
- Similarly, the "Y" joint itself cannot be managed and therefore does not appear in the model.
- The Logical Adaptor object 700 supports the provisioning and management of adaptor functionality irrespective of the way in which it has been realised by protected equipment.
- The Adaptor object 701 supports provisioning and management of individual physical Adaptor units.
- The "realised by" associations between Adaptor and Port objects support flow-through provisioning, whereby changes at the logical Adaptor model level are mapped to changes on the individual physical units. Conversely, problems encountered at the physical level can be mapped back to their (potential) impact at the logical level.
- As before, each managed object has a single parent via containment.

EXAMPLE 3

Link Protection

Telecoms systems often provide levels of resilience for inter-equipment communications, e.g. through path protection, diverse routing or by load-sharing across a set of physical links, to ensure that a level of service can be maintained in the event of link failure. Regardless of how resilience is achieved, a single logical connection exists between two end-points at some level of abstraction. From a management modeling perspective, this logical connection is "realised by" a specific protection scheme.

Figure 8:
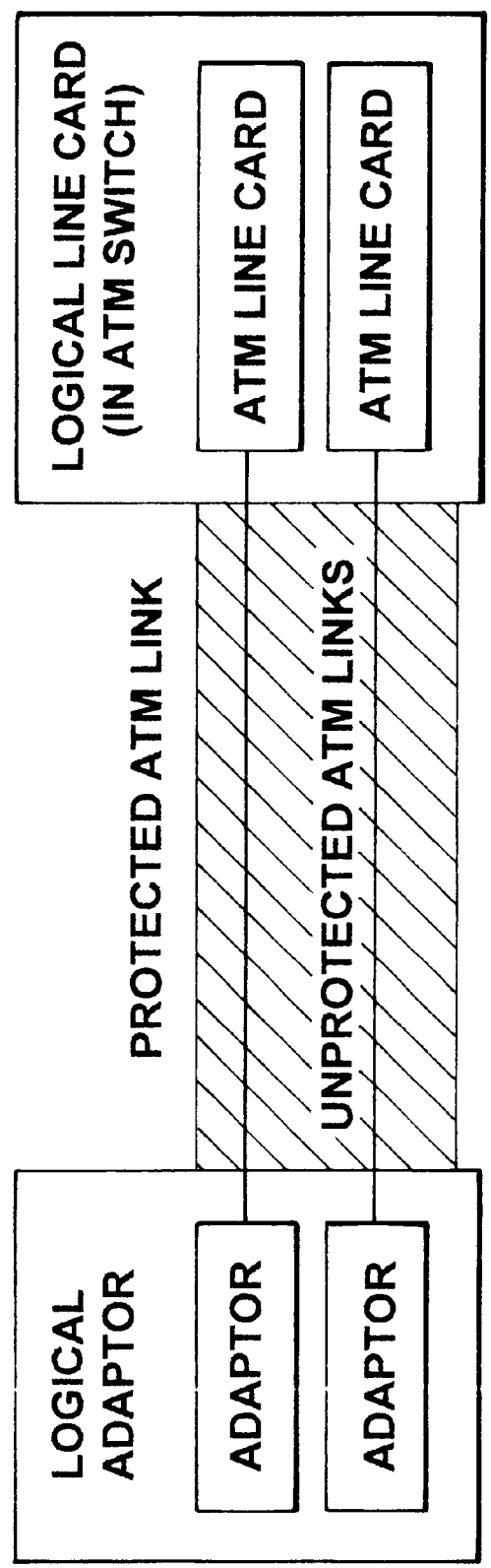
FIG. 8 illustrates schematically how a logical adaptor which is physically realised by a logical line card in an ATM switch by a protected ATM link and a plurality of unprotected ATM links is represented by managed objects in a managed object model, which may be used for construction of a management information base of a communications network.

The TDM-ATM system again provides a pertinent example in the form of a 1+1 protected link between each logical adaptor and the logical ATM switch. FIG. 8 herein shows how a protected link is composed out of two unprotected links.

Figure 9:
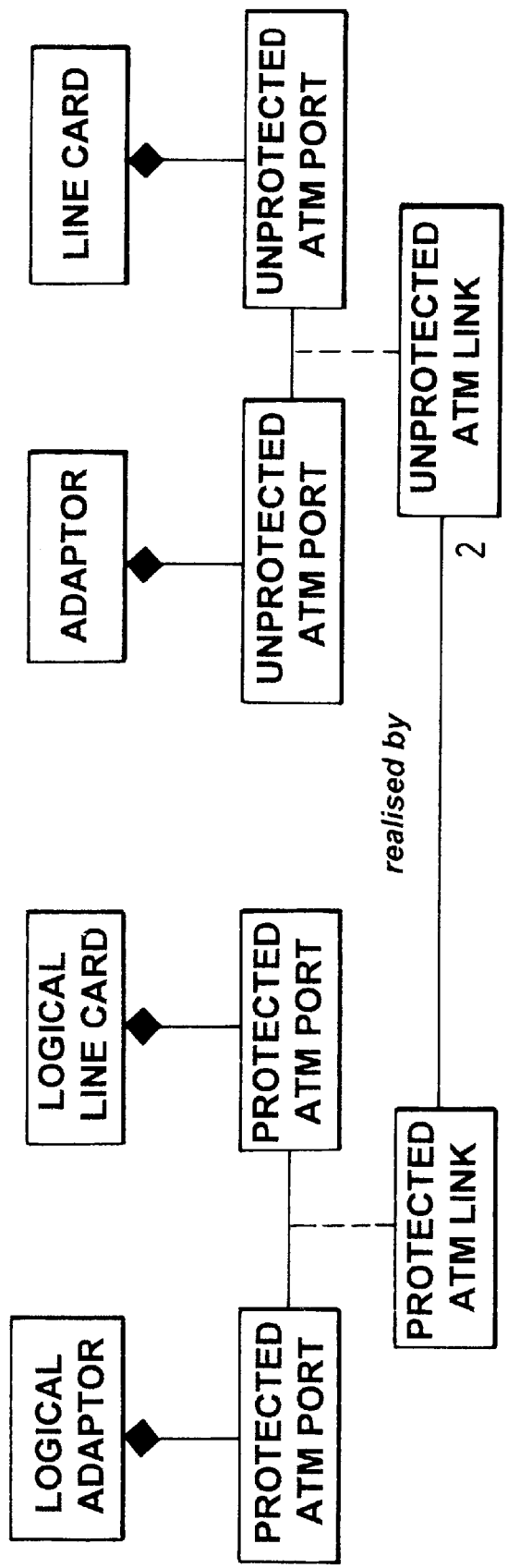
FIG. 9 illustrates schematically a fragment of the management object model of FIG. 8 which corresponds to the protected link functionality.

FIG. 9 herein illustrates the management object model fragment which corresponds to the protected link functionality.

In FIG. 9 herein, the "realised by" associations between equipment and ports have been omitted to avoid clutter. The protected ATM link object can be used to manage the ATM link at the logical level, e.g. to provide overall link reliability measures. The unprotected ATM link object can be used to manage individual physical links, e.g. to measure bit error rates. The principle illustrated in the example can be applied to more complex situations in similar fashion, e.g. where the individual links are replaced by diversely routed transmission paths—a diversity constraint would be added between the two individual paths. The line card objects are contained within ATM switch. The ATM link objects are contained directly within TDM-ATM system (not shown explicitly in FIGS. 5 and 9).

EXAMPLE 4

Software Protection

Telecoms systems need to provide protection against processor, communications and/or software failures. This is normally achieved by replicating software applications across multiple compute platforms.

A flexible scheme is obtained by addressing each application as a logical entity, without the calling software having to know the protection status of the application. Each application instance must have control paths to its associates, to ensure integrity of operation. A typical protocol model is depicted in FIG. 10 herein.

Figure 10:
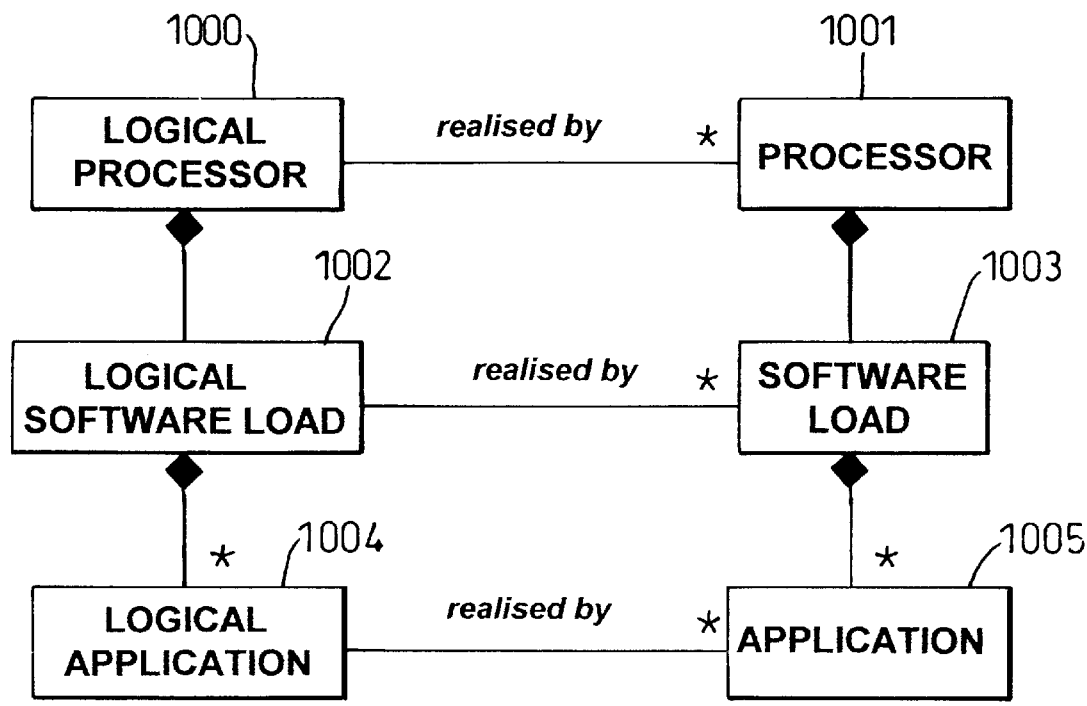
FIG. 10 illustrates schematically a Management Unit Model for the distribution and replication of software applications across a set of processors.
Figure 11:
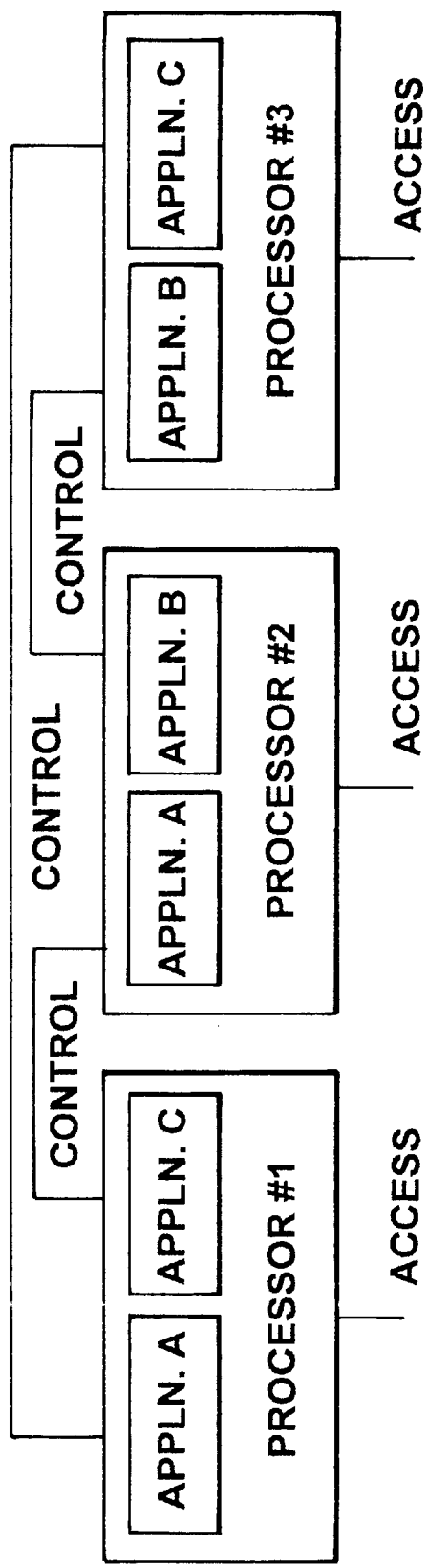
FIG. 11 illustrates schematically an example of a particular case of distribution and replication.

FIG. 11 provides the generic object model fragment which supports the software protection scenario with reference to FIG. 10 herein.

In FIG. 11 herein, logical processor 1100 refers to an abstract processing engine which provides the resiliency mechanisms to support software protection. Processor 1101 is a physical realisation, i.e. one of processor #1 through Processor #3. Logical software load 1102 represents a protected software load, irrespective of which processors it runs on. Software load 1103 is a physical realisation running on a specific processor. The model as provided constrains each logical and physical processor to have a single software load. Logical application 1104 represents a protected software application, irrespective of which processors it runs on (and hence within which software load it is contained). Application 1105 is a physical realisation, i.e. a specific instance of an application running as part of the software load on a specific physical processor.

The model supports management at both the logical and physical levels. For example, software upgrades can be coordinated at the logical level, but individual software loads and problem reporting are handled at the physical level.

EXAMPLE 5

Decomposition of Links and Cross-Connections

Communications within and between telecoms systems are normally constructed from a set of protocol layers, each such layer providing a set of communications services for the layer above. End-to-end connections within a given protocol layer are constructed out of individual links (between pieces of equipment) and cross-connections (within equipment).

The "realised by" association provides a natural means to model how connections are constructed within each communications layer. Furthermore, the end-to-end connections within a given layer can then be used, via containment, to support the individual links within the layer above (a consistent way to model this latter aspect of communications management is furnished within ITU-T recommendation G.805).

Two basic patterns are illustrated with reference to FIG. 12 herein (note that arrows have been used to indicate the direction of the "realised by" association).

An abstract cross-connect 1200 represents a cross-connection which spans either an application or a composite equipment element (such as a system or sub-system). When the cross-connection is expanded out, it becomes "realised by" an interleaved series of N cross-connects 1201 and N−1 links 1202.

Similarly, when an abstract link 1203 is expanded out, it becomes "realised by" an interleaved series of N links 1204 and N−1 cross-connects 1205.

Figure 12:
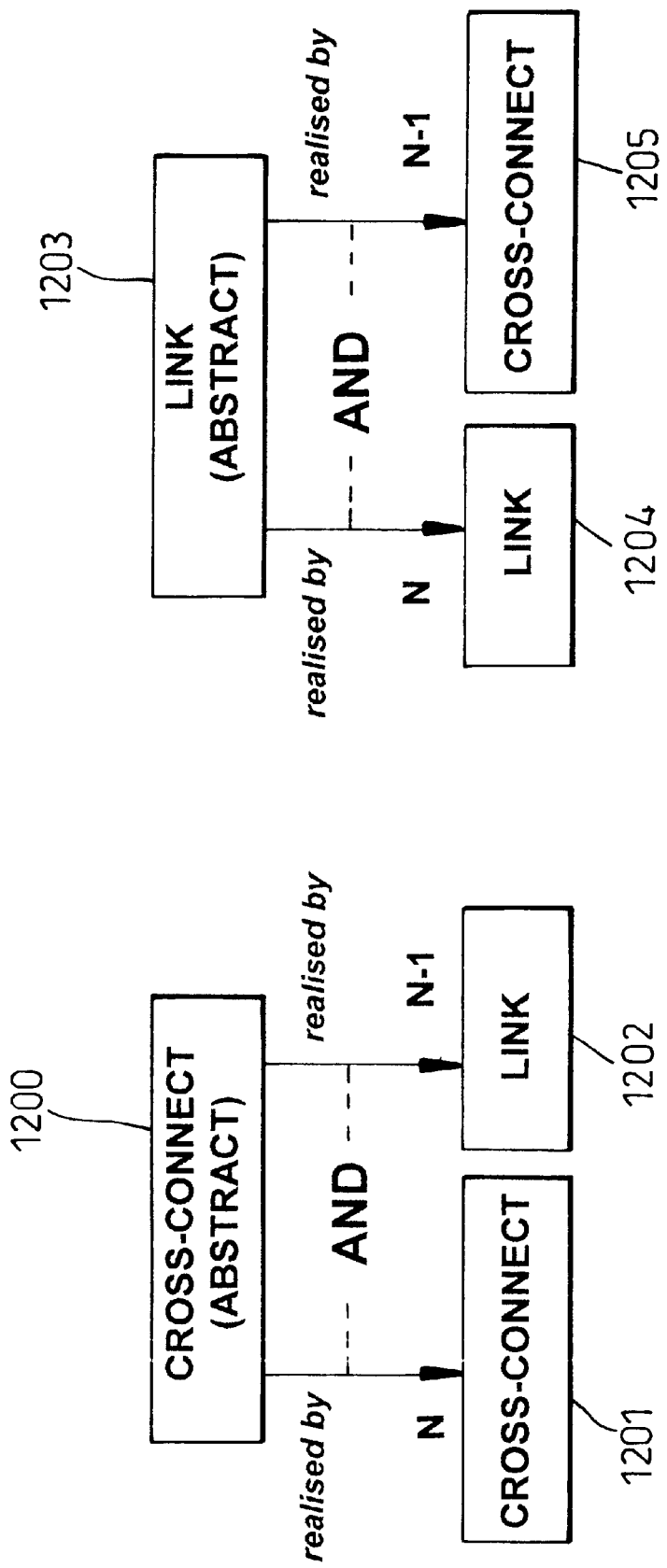
FIG. 12 illustrates schematically how a "black box" object representing a cross-connect function is implemented in terms of a "white box" cross-connect object and a "white box" link object, by means of realisation association, and how a "black box" object representing a link is implemented by a "white box" implementation object of a link and a "white box" Implementation Model of a cross-connect, the "black box" and "white box" representations being connected by means of "realised by" associations according to specific implementations of the present invention.

(The notation used in FIG. 12 herein obviates the need to represent each individual link or cross-connection in the expansion as a separate object. See "Arbitrarily Folded Models" later in this document for further details). An example is provided by ATM, where the virtual circuit (VC) layer sits above the virtual path (VP) layer.

Figure 13:
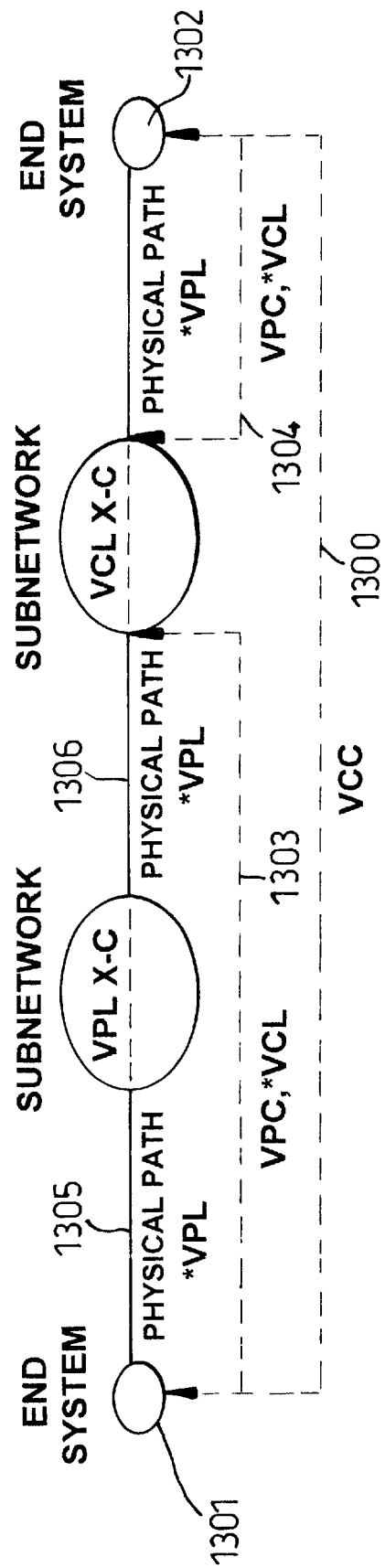
FIG. 13 illustrates schematically a representation of an ATM virtual circuit connection linking first and second end systems by first and second sub-networks.

Referring to FIG. 13 herein, there is illustrated an example of an ATM VC connection (VCC) running across two abstract ATM sub-networks. It introduces some additional concepts, namely: Virtual Path Link (VPL); Virtual Path Connection (VPC); Virtual Circuit Link (VCL), Cross-Connection (X-C).

The elements of FIG. 13 comprise the following:

A VCC 1300 links first and second end systems 1301, 1302. The VCC is "realised by" two VCLs and a VCL X-C.

A number of VCLs 1303, 1304 are contained in a VPC (this is where adaptation between layers occurs). A VPC links two ATM systems (end systems, cross-connects or sub-networks). A VPC is "realised by" a single VPL or by a set of VPLs concatenated using VPL X-Cs.

A number of VPLs 1305, 1306 are contained within each physical ATM path between ATM systems.

Figure 14:
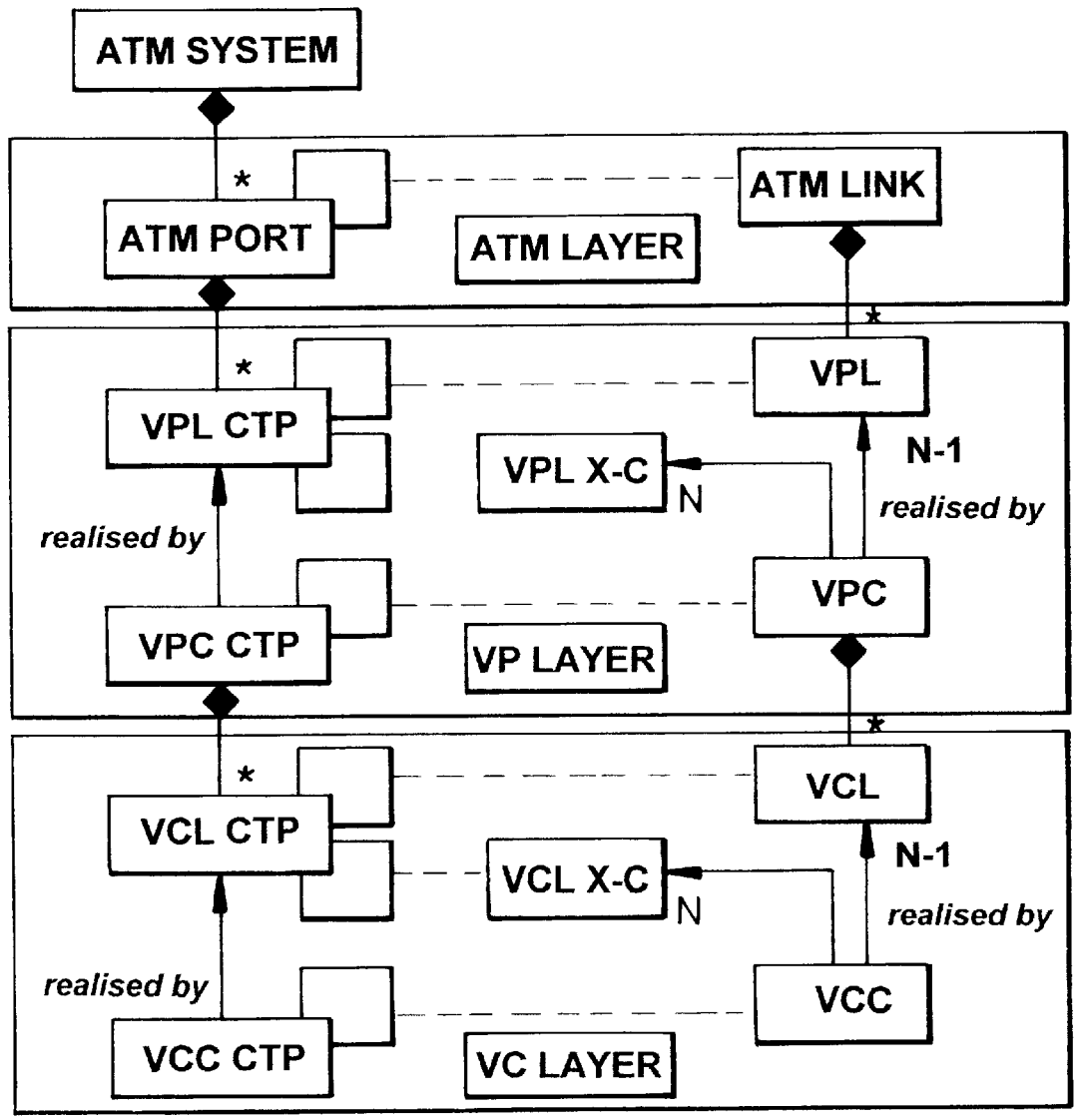
FIG. 14 illustrates schematically a generic management object model corresponding to the virtual circuit connection of FIG. 13 herein.

Referring to FIG. 14 herein, there is illustrated schematically a generic management object model which corresponds to these definitions. The object model of FIG. 14 shows how the containment association is used to join together the VC and VP communication layers and how the "realised by" association is used to depict the construction of each layer connection from its constituent links and cross-connections.

Features of the object model of FIG. 14 include the following:

Arrows have been added to the "realised by" associations to indicate the direction of the associations.

The "realised by" association between VCC CTP and VCL CTP is a consequence of VCC decomposition. However not every VCL CTP is associated with a VCC CTP. The VCL CTP at the End System realises a VCC CTP, but the VCL CTP at the other end of the VCL does not (the latter merely provides the inter-connection point with the VCL X-C. The same situation applies in the VP Layer with respect to the VPC CTP and VPL CTP objects. Thus the VCL and VPL CTPs can play differing roles in the VP Layer and VC Layer Implementation Models some terminating "realised by" associations, some not. This is an example of the modeling flexibility offered by the "realised by" association.

The managed objects in the model are aligned with the ATM Forum recommendations for ATM element and network management. However the model in the specific implementation of the best mode herein adds associations between the network and element management layers which may be used to supported integrated management of ATM networks and systems.

The containment associations which cross layer boundaries correspond to adaptation functions, as described in ITU-T recommendation G.805.

VCCs and VPCs may be constructed from arbitrary numbers of Links (N), together with N−1 cross-connections. The values N and N−1 thus provide numeric constraints.

CTP objects are contained either directly within an Application object (for logical CTPs) or within the equipment object which supports them (for physical CTPs). Cross-connection objects are contained either within an application object (logical) or within a fabric object (physical). Link objects are contained either within a corresponding layer network (logical) or within the composite equipment object which supports them (physical). Thus, once again all managed objects have a single parent via containment to be used for naming, navigation, etc.

EXAMPLE 6

Data Tables

Flow-through provisioning of telecoms systems involves converting single user input to potentially many tables which must be data-filled within the managed equipment.

Figure 15:
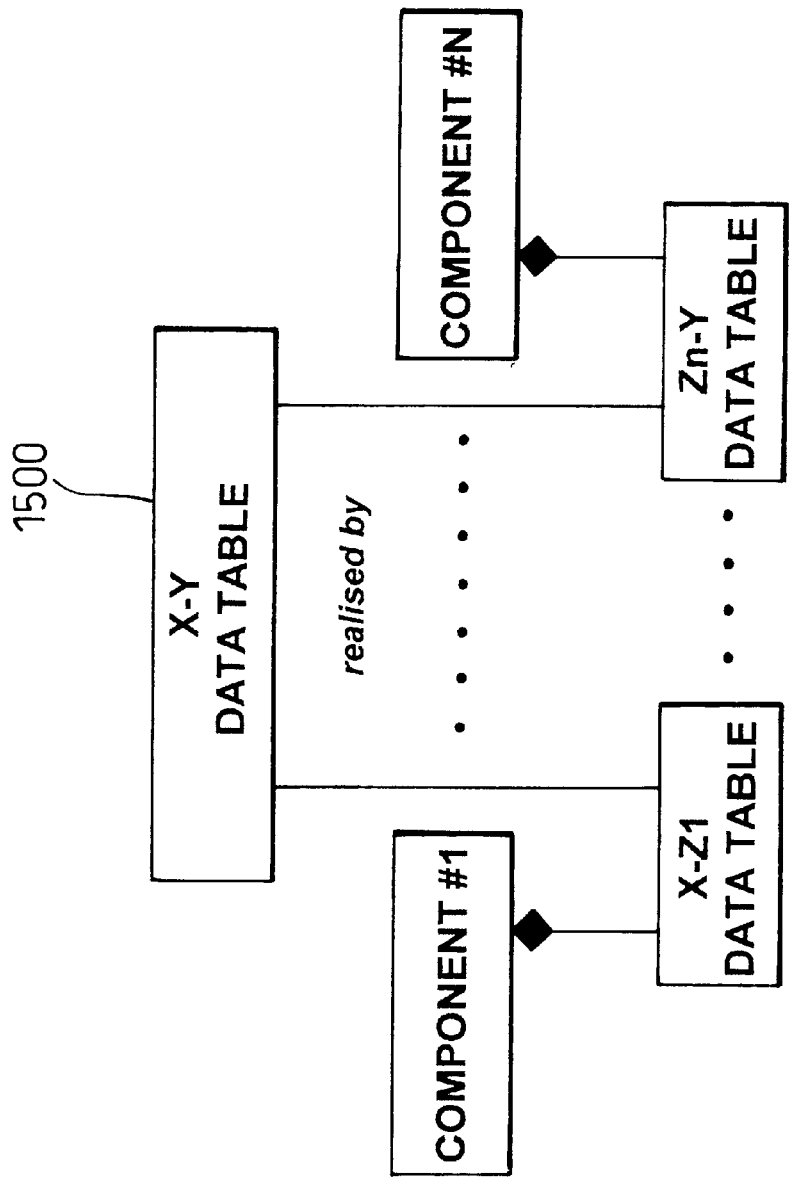
FIG. 15 illustrates schematically a representation of a data table and its realisation in terms of a set of data tables.

The "realised by" association allows individual managed objects representing user-provisioned data tables to be mapped to many corresponding managed objects representing tables on individual equipment components. Referring to FIG. 15 herein there is illustrated a general template for managed object models to accomplish these mappings.

In FIG. 15, X-Y data table 1500 represents managed data that provides an association between two entities X and Y. This data table is "realised by" a set of data tables on separate components, each of which contributes to some aspect of the X-to-Y association.

Realisation in Models (Management Unit Level)

This section presents the model taxonomy, ending with the realisation model and the interactions between its modeling construct and those of the other models. An appendix describes the principal classes appearing in the models, ending with the "realised by" association class.

Figure 16:
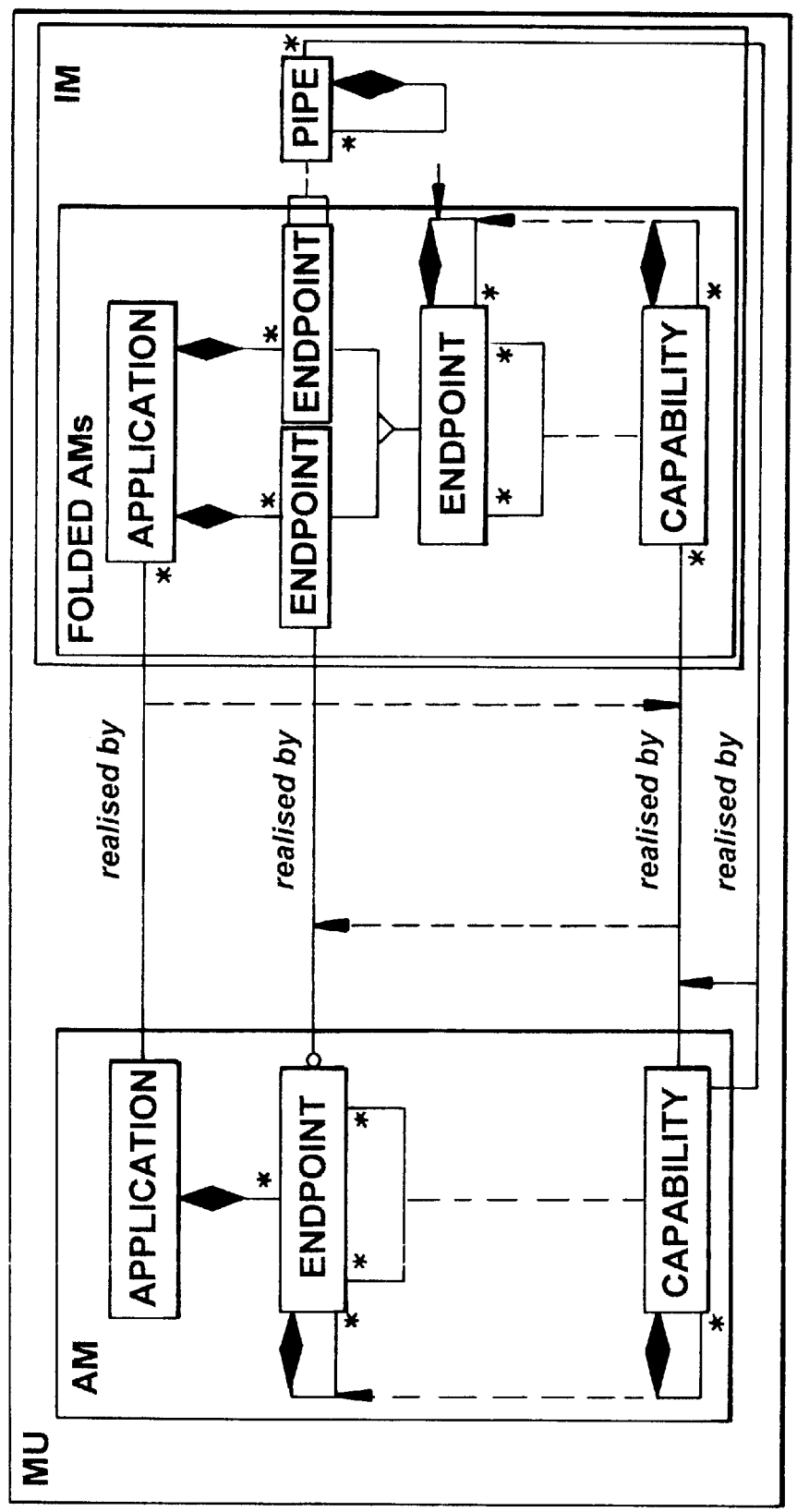
FIG. 16 illustrates schematically a simplified Management Unit Model diagram.

The simplified management unit diagram of FIG. 16 herein emphasizes that capabilities are relationships. Owing to the limitations of UML notation, it can only do this while implying that a single capability can never connect more than a pair of endpoints. It similarly omits broadcast links. (The specialization of endpoint within the Implementation Model is solely to show the disjoint roles it plays. The constraints between relationships are described in the text.)

Figure 17:
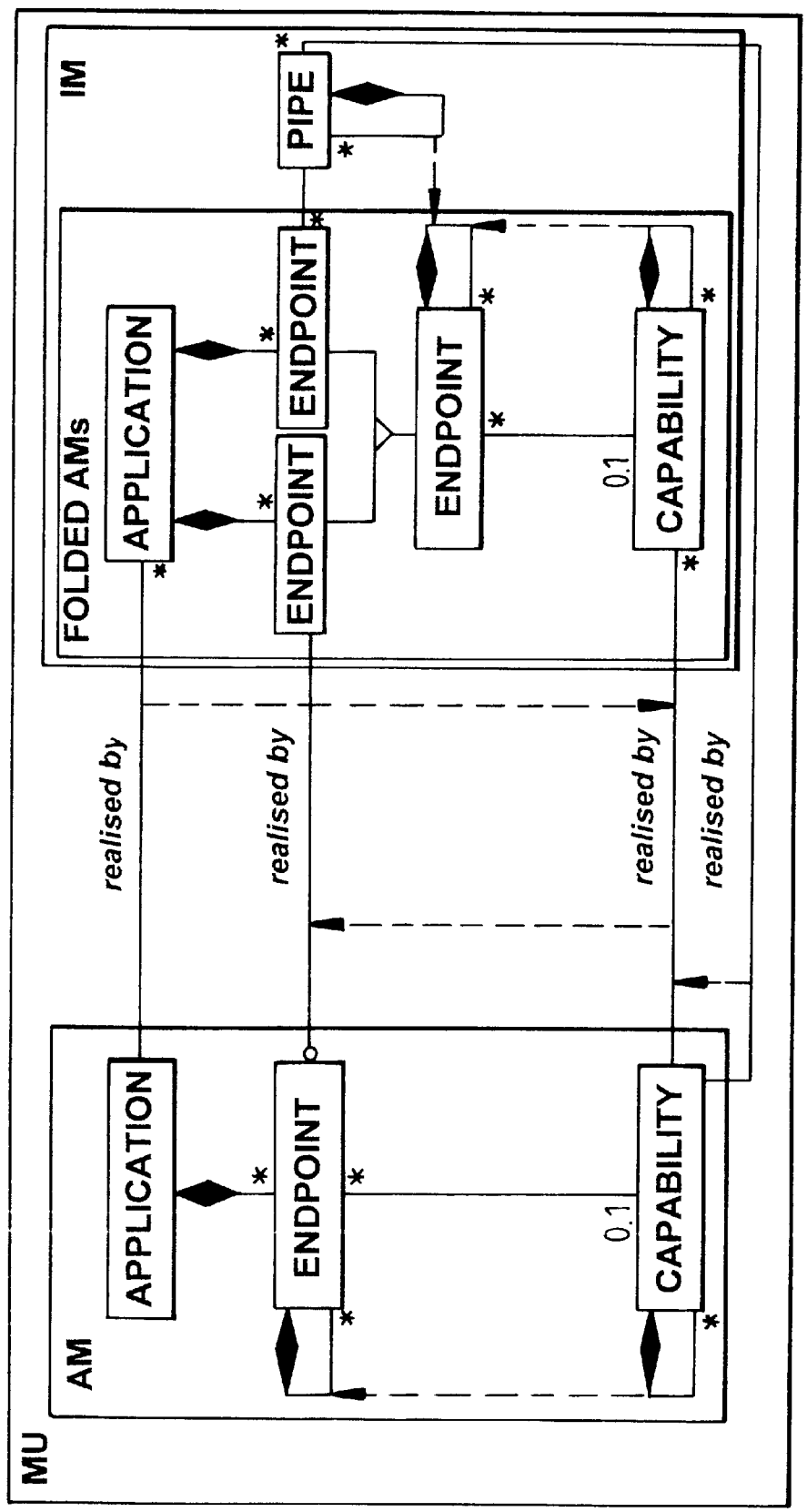
FIG. 17 illustrates schematically a simplified general Management Unit Model diagram.

The more general Management Unit Model shown in FIG. 17 herein allows both capabilities and links that connect more than two endpoints, but at the cost of de-emphasizing their role as relationships.

The kinds of model used in the specific methods and embodiments presented herein are as follows: The Application Model and Implementation Model concepts were introduced in prior disclosures U.S. Ser. No. 08/921,649, now abandoned, and U.S. Pat. No. 6,018,625 and are described again here for clarity, as the other Models make use of them.

Model

A model contains a set of classes and relationships, expressed in UML notation with mathematical annotations. The relationships impose constraints on whether an instance can exist without another instance related to it and how many instances can be related to another. The mathematical annotations may add constraints on closed loops of relations. An instance of a model is a set of instances of these classes and relationships that respects these constraints.

To instantiate a model means to instantiate each of its classes so as to create such a set of instances without reference to any existing instances.

To modify a model instance means to modify one model instance into another by deleting some of its classes' instances and/or instantiating others.

For example, a demand for flow-through provisioning of a new set of capabilities may be specified by performing either of these operations on the appropriate high-level model.

Application Model

An Application Model is the external interface of a management unit; it is the black-box view of the management unit. An Application Model contains: an application root class being a single class to name the model and act as a root for the composition and naming hierarchy within the model; one or more endpoints (ports and/or CTPs) to provide an interface to that management unit (an Application Model does not have to have endpoints, although almost all do. Closed world models are possible); and a set of capabilities (e.g. cross-connections, translations, inter-working functions, etc.) spanning these endpoints.

An Application Model rarely contains links to its endpoints, but links can appear in Application Models for "network" applications (for example, the Application Model for SS7 contains a Signaling Link class).

Implementation Model

An Implementation Model is the internal realisation of a management unit; it is the "white-box" view of the management unit. An Implementation Model consists of configurations of either (classes in) lower-level Application Models or of classes (agents) that interface to the network elements without further mediation within the modeling method. In addition to the application, endpoint and capability classes it acquires from subordinate Application Models, it contains link classes connecting some of the endpoints.

Management Unit Model

A Management Unit Model, comprises an Application Model plus an Implementation Model plus a set of "realised by" associations showing how the endpoints and capabilities of the Application Model are realised by the endpoints and capabilities of the Implementation Model. A management unit is a unit of granularity of a modeled network, so is distinguished for use in managing the network.

An Application Model may figure in many different management units, being realised differently in each. Likewise, an Implementation Model may figure in more than one management unit, realizing a different subset of its overall functionality within each. Only the realisation model of "realised by" associations between its Application Model and Implementation Model classes is unique to the management unit.

Equipment Model

An Equipment Model is a management unit whose Implementation Model interfaces to some device or function external to the modeling context. This is a defined aspect of an management unit; it is not computed. The same Application Model may be associated with an externally-realised Implementation Model in one (Equipment Model) management unit and with an Implementation Model containing subordinate Application Models in another (Architecture Model) management unit.

Architecture Model

An Architecture Model (ArM) comprises a management unit whose Implementation Model is composed of a configuration of Application Models. An Architecture Model's Implementation Model consists of subordinate Application Models of other management units, configured such that:

some of the subordinate Application Models endpoints are linked to each other the remaining unlinked endpoints realise the endpoints of the management unit's Application Model the network of linked capabilities between those endpoints realises the capabilities of the management unit's Application Model.

A given set of (compatible) management units thus defines an ordered realisation network of models, from top-level Architecture Models through intermediate level ones to bottom-level Equipment Models. This network is partially ordered closed.

Realisation Model

The realisation model connects a management unit's Application Model to its Implementation Model. It enforces the constraints (in mathematical terms, the commutativity rules) that arise between "realised by" associations in an realisation model due to relationships between the classes they relate. Such constraints are valuable in promoting clean designs and allowing automated reasoning about models.

Two relations R and S commute if $R°S$ necessarily equals $S°R$. They anti-commute if $R°S$ necessarily does not equal $S°R$. A relation, or sequence of relations, between members of the same class is reflexive if $R(x,x)$ always holds and irreflexive if $R(x,x)$ never holds. These terms are a subset of a range of mathematical annotations on relations, involute (i.e. between members of same class) relations and closures of relations that are useful (sometimes essential) additions to the UML notation when defining model types such as those described in this section.

Classes in models are related by composition, connection and realisation relationships. Connection and composition were introduced in U.S. Ser. No. 08/921,649, now abandoned, and U.S. Pat. No. 6,018,625 and so will be described here only as necessary to explain their effect on the Realisation Model.

Composition does not cross model boundaries, except that model root classes contain other models' root classes as their model contains those models (i.e. model containment equals root class containment); otherwise composition is limited to classes that are either both within an Application Model or both within an Implementation Model and outside its subordinate Application Models.

Connections are either Links or Capabilities.

The "realised by" association respects the type system of the method: applications realise applications, endpoints realise endpoints and connections realise connections.

An endpoint that is unlinked in a management unit's Implementation Model may realise an endpoint in that management unit's Application Model one-for-one (only).

A sequence or network of linked capabilities in a management unit's Implementation Model, each linked to the next via one of its endpoints, defines an overall capability between the unlinked endpoints of the capabilities terminating the sequence. This overall capability may satisfy one required by the management unit's Application Model. A realised capability has "realised by" associations to each of its realizing capabilities and links.

If an Application Model's endpoints and capabilities realise another Application Model's endpoints and capabilities then that Application Model's root class realises the other Application Model's root class.

Capability connection and realisation commute: if a capability is realised in an management unit then its endpoints must also be realised in that management unit, and vice versa. (The same applies to links appearing in the management unit's Application Model.)

(Implementation model link connection and realisation also commute but in a different way. Links connect endpoints in two different subordinate Application Models of an Implementation Model. Either or both Application Models of a link may be replaced by their realizing Implementation Models; the link's endpoints are replaced by their realisers and the link connects them. Hence, although only shown on the Implementation Model containing the top-level endpoints of each side of the link, a link implicitly connects the entire realisation hierarchy of each of their endpoints.)

Realisation and composition also commute.

If an endpoint contains another, the realiser of the first must contain the realiser of the second.

If a capability contains another and each is realised by an arrangement of capabilities and links, then the elements of the first sequence in each subordinate Application Model within the realizing Implementation Model contain those of the second and the links between them contain each other similarly.

In both cases, indirect composition is permitted on the realizing side.

Arbitrarily Folded Models

Models with a fixed number of folds are disclosed in U.S. Ser. Nos. 08/921,649 and 08/921,225. The idea generalizes to models with arbitrary numbers of folds. Just as one end of a relationship in UML can be annotated either with a given integer or so as to mean 'any number', so an assemblage of folded Application Models and links within an Implementation Model can be annotated either to is indicate some particular number of folds intended or to indicate that the folded model can be unfolded arbitrarily often and represents all unfolded models that can be so obtained.

Example 5 in the "realised by" association section above (abstract cross-connect or link) shows how realisation can make use of models with arbitrary numbers of folds. The arbitrarily folded Implementation Model of an abstract cross-connection's management unit can be unfolded into an Implementation Model that contains any number N of cross-connects and N−1 of links. Similarly, the abstract link's Implementation Model can be unfolded into an Implementation Model that contains any number N of links and N−1 of cross-connects.

Contraction Rules

It often happens that particular assemblages of classes within models are fixed (e.g. by standards) and so may be replaced by a single class without loss of meaning (the equivalent full assemblage being held in some library of model fragments). In such cases, a variety of meaning-preserving contraction rules may be used to simplify model representations.

For example, where an endpoint's protocol, reliability or other attributes mean that it necessarily contains a fixed set of other endpoints, a contraction rule governs how to replace the composition assembly with the single container endpoint while preserving model constraints.

When a bi-directional endpoint in an Application Model is composed of two uni-directional endpoints, each of which is realised by an appropriate Implementation Model endpoint, a contracted model will just show the bi-directional endpoint being realised by the two Implementation Model endpoints.

A similar case arises in Example 2 above. In strict detail, the model should show the protected ATM and E1 ports being each composed of two unprotected ports (whose activity states the protected ports manage), with each unprotected port being realised by a single Implementation Model port. In FIG. 7, the endpoint composition contraction rule is used to omit this decomposition and show two unprotected Implementation Model ports directly realizing one protected Application Model port.

In both cases, the apparent contradiction with the one-for-one endpoint realisation rule can be resolved by the contraction rule.

Appendix A: Principal managed object-level Classes

Most managed object-level classes that appear in the above models belong to one of the following kinds.

Figure 18:
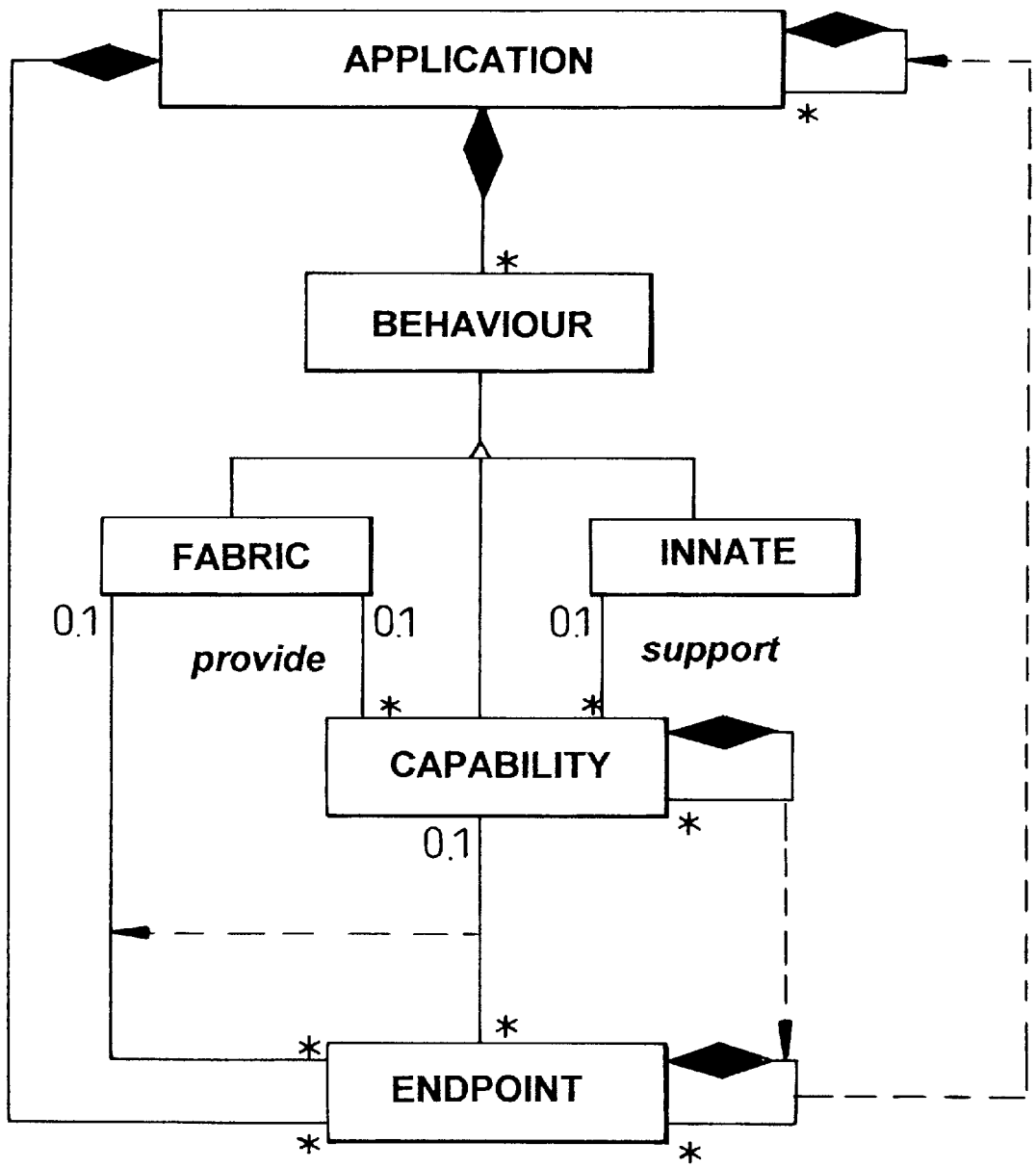
FIG. 18 illustrates schematically a general Application Model diagram.

A general Application Model diagram is illustrated in FIG. 18 herein.

Application

Every Application Model contains an application root class. This acts as the root of the model's containment tree and as a name slot to identify the Application Model being defined. In principle, every application class can be the root of an Application Model. In practice, complex Application Models can contain subordinate application classes contained within the root class.

An Implementation Model has an Implementation root class and a Management Unit Model has an management unit root class, performing the same roles. in those models as the application root class in its Application Model. The implementation root class can contain application root classes and/or individual managed object classes. management unit root classes are usually not shown but left implicit when drawing management unit diagrams. Implementation Model root classes are sometimes not shown.

Endpoint

Endpoints appear in Application Models only. Endpoints terminate Connections. An endpoint has an internal-to-Application Model role as the class on which a capability may terminate and a (normally) external-to-Application Model role as the class on which a link may terminate. Endpoints act as interface classes between an Application Model and classes of other models with which it combines within an Implementation Model or management unit.

Endpoint specializes to port (physical endpoint) and termination point (logical endpoint). Common subclasses of termination point are trail and (in the telecoms standards sense, to be distinguished from our more general usage of the word) connection.

Behavior

The properties of the (real or virtual) device or function represented by an Application Model are captured in behaviors. There are capability, innate and fabric behaviors. Behaviors only appear in Application Models.

Capability

A capability comprises a behavior which represents the transformation of data between a number (typically two) of endpoints within an Application Model. Hence, in principle, a capability connects endpoints of different type and/or location and/or capacity. The capability is said to span the endpoints.

A capability is an exportable behavior; one that can directly contribute to realizing a higher-level capability when its Application Model is part of the Implementation Model of a higher-level management unit. Its exportability comes from the nature of its endpoints; they must all be either joined to others via links in the higher-level management unit's Implementation Model, or themselves realise endpoints of the higher-level management unit's Application Model.

Typical subclasses of capability are cross-connections (between identical endpoint types) and interworking functions (between dissimilar endpoint types).

Fabric

Fabric classes provide capabilities. They may have relationships to endpoints but are not themselves relationships between endpoints; their function is to provide capabilities that connect subsets of their endpoints. For example, a DS0 fabric capability might span two sets of 32 DS0 TPs and be able to provide up to 32 DS0 cross-connect capabilities, each spanning two DS0 TPs, one from each set.

Fabrics track the total numbers or other resource limits of the subordinate behaviors, record limits to the endpoints between which they can be provided and serve as a configuration placeholder for the capability to provide these capabilities, independent of the latter's actual presence.

The existence of a parametrized class of capabilities (parametrized by the endpoints they connect as in the example above or otherwise) within an Application Model implies the existence of a fabric capability to provide them. Hence it may not be necessary to represent a fabric class explicitly in a given model.

Innate

Innate behaviors support others directly and internally to an Application Model, without the mediation of endpoints. Examples include fault behaviors, performance monitoring objects and log records.

Link

A link is normally a standard one-one binary relationship (broadcast links are one-to-many): each link connects precisely one endpoint to precisely one other; each endpoint can be linked to precisely one other endpoint. As only a link can appear in an in an Implementation Model outside any subordinate Application Model, it is always a link that connects the endpoints of different Application Models.

Irreducible Link

This term concerns the interconnection of two objects by a relationship that is not manageable (sometimes purely conceptual in nature—e.g. a link might record that a plug is in a socket; there is no real object connecting the plug to the socket) or whose network management behavior is too trivial to be worth modeling as an management unit.

(For example, in a model being used for fault management, an irreducible link should have no non-trivial failure behavior independent of the management units owning the objects that it connects; it is either there or it is not.)

The endpoints of irreducible links are necessarily of the same type if bi-directional and of conjugate types if uni-directional (e.g. they must both be bi-directional SDH ports or one must transmit SDH, the other receive it).

Reducible Link

A link may not have trivial network management behavior in a fundamental sense. It may simply be a manageable connection that did not need to be modeled further in a given context or epoch. Such a link is said to be reducible (and has non-trivial network management behavior).

Realised_by

This class, at the managed object level, has been defined in detail above.

The "realised by" association is the only class that can exist in an management unit outside of its Application Model and Implementation Model. It lives in the management unit's realisation model. Realisation is an asymmetric relationship: if A realises B then B cannot realise A.

The endpoint or capability "realised by" association holds data on how much of the realizing capability's or endpoint's bandwidth, slots or other capacity measure is being provided to the realised capability or endpoint.

Appendix B: Examples of Realisation Relationships in Code

The "realised by" relationship is first used in analysis and high-level design. It helps the analyst separate modeling the abstract functionality that a system will offer from modeling how these functions will be realised by the systems components. As the analysis and design in general influence the code that is finally produced, so the realisation relationships within these models can be found in the resulting code.

This appendix gives three simple examples of what a "realised by" relationship may look like in code. All the examples are written in Smalltalk in the context of an ATM switch element manager.

Figure 19:
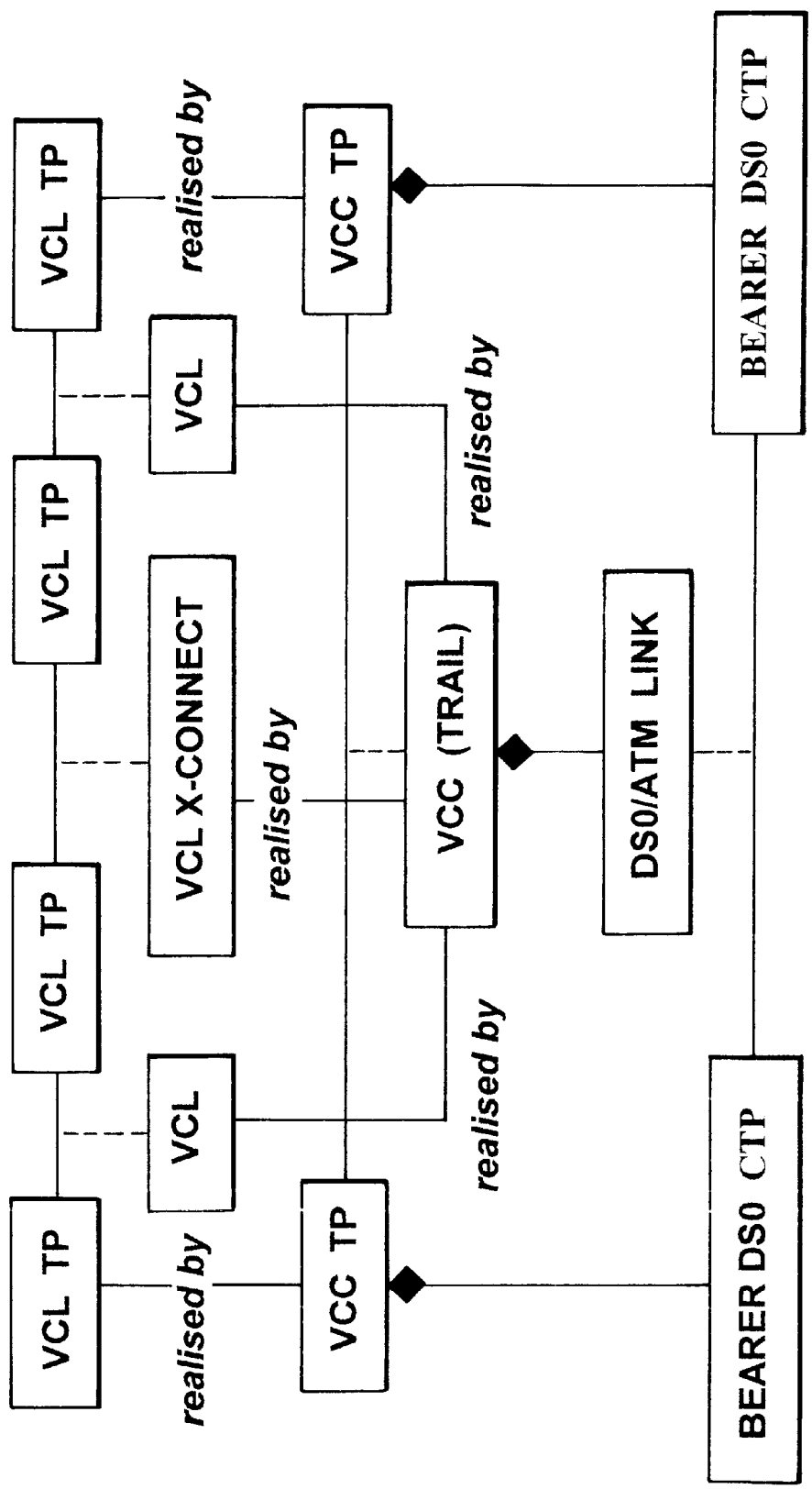
FIG. 19 illustrates schematically a virtual circuit connection trail being realised by two virtual circuit links and a virtual circuit cross-connect according to a specific method of the present invention.

FIG. 19 herein illustrates schematically a VCC trail being realised by two VC links and a VC cross-connect. The trail contains a number of DS0 links. Termination points are realised compatibly: DS0 CTPs are contained within VCC TPs which are realised by VCL TPs. Demand for DS0s will create demand for VCC trails. Any VCC trail thus demanded will attempt to provision itself by demanding all its realisation links.

Realisation mapped to the standard Object-Oriented interface-implementation relationship The most minimal way of implementing a "realised by" relationship is as the relationship between the interface and implementation of a single object. If object A is "realised by" object B in the design then the implementation is a single object C whose interface represents A and whose implementation represents B. If, in the analysis model, A can be commanded to do X, which it achieves by asking B to do Y, where B then invokes Z, then in the implementation the single object C is commanded to do X and responds by invoking Z.

For example, suppose, in the above model, we implement the aggregation VCC TP "realised by" VCL TP as a single object. Then provisioning it might be done as follows.

VCTP class>>provisionEndFor: aVCC in: aVPTP

"Create combined TP object for both trail and its end link"

^(self new)
   containedBy: aVPTP;
   vccTrail: aVCC;
*** vcLink: (aVCC realisedBySet) first;
   .... (other setup commands) ... ;
yourself.

In this example, the *** line achieves an effect that in the model above would be triggered by the "realised by" relationship between a VCC TP and the VCL TP that it, on being provisioned, would automatically create. Having chosen to combine the two classes, we must hardwire this relationship into the relationship between the top-level provisioning method and its implementation.

Realisation implemented directly.

The simplest way of implementing a "realised by" relationship is as a relationship in the code. This can be done specifically (specific classes implement their own realisation relationships to those that realise them on a case by case basis) or generically (a high-level class implements the "realised by" relationship, with all its semantic meaning; specific classes inherit from it).

In the first case, the provisioning of a VCC Trail might be as follows.

VCCTrail class>>provisionOver: aCrossConnectFabric
   from: aVCCTP
   to: anotherVCCTP "Provision VCC Trail object end-end over one cross-connect"

|aVCLinkXC| aVCLinkXC:=aCrossConnectFabric provisionVCLX-Connect.

^(self new)
   realisedByXC: aVCLinkXC;
   realisedByLinkA:
     (VCLink provisionFrom: (aVCCTP realisedBy)
       to: aVCLinkXC);
   realisedByLinkZ:
     (VCLink provisionFrom: aVCLinkXC
       to: (anotherVCCTP realisedBy);
   .... (other setup commands) ... ;

yourself.
or, in a slightly more general form,
VCCTrail class>>provisionOver: aVPlevelNetwork
   from: aVCCTP
   to: anotherVCCTP
"Provision VCC Trail object end-end over a VP level network"
^(self new)
   realisedBySet: aVPlevelNetwork
      findVPlevelRouteFrom: (aVCCTP realisedBy)
      to: (anotherVCCTP realisedBy);
   .... (other setup commands) ... ;
yourself.
Realisation implemented generically.

In the above, the model has guided the coding but it has done so specifically, not generically. The abstract semantic meaning of "realised by" appears in the style of coding the specific relationships. A more generic approach, in which we implement the semantics of "realised by" as code, is shown below.

VCCTrail class>>provisionOver: aVPNetwork
   from: aVCCTP
   to: anotherVCCTP
"Provision VCC Trail object end-end over a VP level network"
|aVCLinkXC|
aVPlevelRoute:=
^(self new)
   realisedBySet: aVPNetwork
      findVPlevelRouteFrom: (aVCCTP realisedBy)
      to: (anotherVCCTP realisedBy);
   .... (other setup commands) ... ;
yourself.

What is claimed is:

1. A network management system for managing a communications network, said management system comprising:
   at least one processor; and
   a data storage device,
   wherein functionality and resources of said communications network are represented by managed objects, and at least one association links classes of said managed objects representing said functionality with classes of said managed objects representing said resources.

2. The network management system according to claim 1, wherein said associations are contained within at least one realisation model.

3. The network management system according to claim 2, wherein said realisation model comprises at least one realised by association.

4. A method of creating a network management system for managing a communications network wherein functionality and resources of said communications network are represented by managed objects, said method comprising the step of:
   creating at least one association linking classes of said management objects representing said network functionality with classes of said managed objects representing said network resources.

5. The network management system according to claim 1, wherein said classes and said associations are represented by means of object oriented modeling.

6. A design method for creating a management system for managing a plurality of physical and logical resources, said design method comprising the steps of:
   identifying at least one unit of said resources to be managed as a whole and arranged to carry out at least one function;
   for each of said at least one unit, representing said at least one function by a "black box" representation in which said functionality is represented as a set of managed objects, independently of the specific physical resources which provide said functionality;
   for each said "black box" managed object representation of functionality, representing physical and logical resources which implement said functionality by at least one "white box" managed object representation; and
   associating said "black box" managed object representations with their corresponding "white box" representations by means of a plurality of associations.

7. The method as claimed in claim 6, wherein a plurality of said "black box" representations are collectively associated with a corresponding plurality of said "white box" managed object representations, by a plurality of corresponding said associations.

8. A network management method for managing a plurality of physical and logical resources co-operating to provide communications functionality, and comprising the step of:
   representing said physical and logical resources by a plurality of managed object models comprising:
   a management unit object model, said management unit object model comprising a model of "black box" managed objects representing a functionality provided by said resources independently of implementation of said functionality;
   a plurality of "white box" managed objects, said "white box" managed objects representing implementation of said functionality by said plurality of physical resources; and
   a plurality of associations, said associations connecting a plurality of endpoints and capabilities of said "black box" managed objects with a corresponding set of end points and capabilities of said "white box" managed objects.

9. The method as claimed in claim 8, wherein a said "black box" managed object comprises a said endpoint.

10. The method as claimed in claim 8 wherein a said endpoint comprises a managed object representing a physical endpoint.

11. The method as claimed in claim 8, wherein a said endpoint comprises a managed object representing a logical endpoint.

12. The method as claimed in claim 8, wherein a said capability comprises a managed object representing a behavior which represents transformation of data between at least one endpoint and at least one said "black box" managed object.

13. The method as claimed in claim 8, wherein a said capability comprises a managed object representing a cross-connection between first and second physical or logical endpoints.

14. The method as claimed in claim 8, wherein a said capability comprises a managed object representing an interworking function between first and second physical or logical endpoints.

15. The method as claimed in claim 8, wherein a said "black box" managed object comprises a behavior object, said behavior object representing interconnections between said physical resources.

16. A management system for managing a plurality of physical and logical resources co-operating to provide communications functionality, said management system comprising a data processing means and a data storage means, in which said physical and logical resources are represented by a plurality of managed object models comprising:

a management unit object model, said management unit object model comprising a model of "black box" managed objects representing a functionality provided by said resources independently of implementation of said functionality;

a plurality of "white box" managed objects, said "white box" managed objects representing implementation of said functionality by said plurality of physical resources; and a plurality of associations, said association connecting a plurality of endpoints and capabilities of said "black box" managed objects with a corresponding set of end points and capabilities of said "white box" managed objects.

* * * * *